United States Patent
Yonetsuji

(10) Patent No.: US 11,288,845 B2
(45) Date of Patent: Mar. 29, 2022

(54) INFORMATION PROCESSING APPARATUS FOR COLORING AN IMAGE, AN INFORMATION PROCESSING PROGRAM FOR COLORING AN IMAGE, AND AN INFORMATION PROCESSING METHOD FOR COLORING AN IMAGE

(71) Applicant: Preferred Networks, Inc., Tokyo (JP)

(72) Inventor: Taizan Yonetsuji, Tokyo (JP)

(73) Assignee: PREFERRED NETWORKS, INC., Tokyo (JP)

( * ) Notice: Subject to any disclaimer, the term of this patent is extended or adjusted under 35 U.S.C. 154(b) by 0 days.

(21) Appl. No.: 16/261,117

(22) Filed: Jan. 29, 2019

(65) Prior Publication Data
US 2019/0236813 A1     Aug. 1, 2019

(30) Foreign Application Priority Data
Jan. 30, 2018 (JP) .............................. JP2018-013489

(51) Int. Cl.
*G06T 11/00* (2006.01)
*G06N 20/00* (2019.01)
(Continued)

(52) U.S. Cl.
CPC ........ *G06T 11/001* (2013.01); *G06K 9/00523* (2013.01); *G06K 9/4628* (2013.01);
(Continued)

(58) Field of Classification Search
CPC ....... G06T 11/001; G06T 11/203; G06T 7/13; G06T 7/00; G06T 2207/20081;
(Continued)

(56) References Cited

U.S. PATENT DOCUMENTS

2012/0026184 A1* 2/2012 Kashio .................. G06T 5/008
345/589
2018/0082407 A1  3/2018 Rymkowski et al.
(Continued)

FOREIGN PATENT DOCUMENTS

JP    H09-134422 A    5/1997
JP    2004-334814 A    11/2004

OTHER PUBLICATIONS

Gatys, Leon A., Alexander S. Ecker, and Matthias Bethge. "A neural algorithm of artistic style." arXiv preprint arXiv:1508.06576 (2015).*
(Continued)

*Primary Examiner* — King Y Poon
*Assistant Examiner* — Vincent Peren
(74) *Attorney, Agent, or Firm* — Foley & Lardner LLP

(57) ABSTRACT

An information processing apparatus includes a memory and processing circuitry coupled to the memory. The processing circuitry is configured to acquire target image data to be subjected to coloring, designate an area to be subjected to coloring by using reference information in the target image data, determine reference information to be used for the designated area, and perform a coloring process on the designated area by using the determined reference information, based on a learned model for coloring which has been previously learned in the coloring process using the reference information.

28 Claims, 9 Drawing Sheets

(51) Int. Cl.
| | |
|---|---|
| *G06N 3/08* | (2006.01) |
| *G06K 9/00* | (2006.01) |
| *G06K 9/46* | (2006.01) |
| *G06T 7/00* | (2017.01) |

(52) U.S. Cl.
CPC ............. *G06K 9/4652* (2013.01); *G06N 3/08* (2013.01); *G06N 20/00* (2019.01); *G06T 7/00* (2013.01)

(58) Field of Classification Search
CPC .......... G06T 5/008; G06N 20/00; G06N 3/08; G06K 9/00523; G06K 9/4628; G06K 9/4652; G06F 3/04847
See application file for complete search history.

(56) References Cited

U.S. PATENT DOCUMENTS

| | | | | |
|---|---|---|---|---|
| 2018/0150947 | A1* | 5/2018 | Lu | G06T 5/20 |
| 2018/0285679 | A1* | 10/2018 | Amitay | G06K 9/4642 |
| 2019/0058489 | A1* | 2/2019 | Matsuo | G06N 5/046 |
| 2019/0087982 | A1 | 3/2019 | Matsumoto | |
| 2020/0082249 | A1* | 3/2020 | Hua | G06T 11/001 |

OTHER PUBLICATIONS

Hensman, Paulina, and Kiyoharu Aizawa. "cGAN-based manga colorization using a single training image." 2017 14th IAPR International Conference on Document Analysis and Recognition (ICDAR). vol. 3. IEEE, 2017.*
Ito, Kota, et al. "Interactive region segmentation for manga." 2016 23rd International Conference on Pattern Recognition (ICPR). IEEE, 2016.*
Zhang, Lvmin, et al. "Style transfer for anime sketches with enhanced residual u-net and auxiliary classifier gan." 2017 4th IAPR Asian Conference on Pattern Recognition (ACPR). IEEE, 2017.*
Furusawa, Chie, et al. "Comicolorization: semi-automatic manga colorization." Siggraph Asia 2017 Technical Briefs. 2017. 1-4.*
U.S. Office Action, U.S. Appl. No. 16/135,627, dated Feb. 10, 2020.
Jing et al., "Neural Style Transfer: A Review," arXiv: 1705.04058v6 [cs.CV] Available on the Internet <URL: http://arxiv.org/abs/1705.04058> (submitted May 11, 2017, last revised Jun. 17, 2018).
Preferred Networks, Inc., "PaintsChainer: line drawing automatic coloring service," (Jan. 27, 2017), Available on the Internet <URL: https://paintschainer.preferred.tech/>.
Qu et al., "Manga Colorization," AMC transactions on Graphics (Siggraph 2006 issue), vol. 25, No. 3, (Jul. 2006) pp. 1214-1220. Available on the Internet <URL: http://www.cse.cuhk.edu.hk/~ttwong/papers/magna/magna.html>.
Sangkloy et al., "Scribbler: Controlling Deep Image Synthesis with Sketch and Color," Computer Vision and Pattern Recognition, CVPR (2017), Available on the Internet <URL: http://scribbler.eye.gatech.edu/>.
Yonetsuji, "PaintsChainer," SlideShare, (Mar. 22, 2017), Available on the Internet <URL: https://www.slideshare.net/taizanyonetuji/chainer-meetup-73457448>.
Yonetsuji, "Using Chainer to colors ketches yields surprising results," Qiita (Dec. 25, 2016), Available on the Internet <URL:http://qiita.com/taizan/items/cf77fd37ec3a0bef5d9d>.
Zhang, "Colorful Image Colorization," Siggraph 2016, <http://richzhang.github.io/colorization/>.
Zhang, "Real-Time User-Guided Image Colorization with Learned Deep Priors," Siggraph 2017, Available on the Internet <https://richzhang.github.io/ideepcolor/>.
Furusawa et al., "Comicolorization: Semi-Automatic Manga Colorization," arXiv, https://arxiv.org/pdf/1706.06759.pdf (Sep. 2017).
Keisuke Hasegawa, "Artificial intelligence Adobe Sensei is amazing! Technical summary of 11", Cameraman Keisuke, Oct. 24, 2017 <https://ksk-h.com/adobesensei/>.
Illyasviel, "Style2pants V4", Github, <https://github.com/Illyasviel/style2paints>.
Iizuka et al., "Let there be Color!: Joint End-to-end Learning of Global and Local Image Priors for Automatic Image Colorization with Simultaneous Classification," ACM Transaction on Graphics (Proc. of Siggraph), vol. 35, No. 4, Section 110, (2016) Available on the Internet <URL: http://hi.cs.waseda.ac.jp/~iizu ka/projects/colorization/ja/>.
Keisuke Hasegawa, "AArtificial intelligence Adobe Sensei is amazing! Technical summary of 11", Cameraman Keisuke, Oct. 24, 2017 <https://ksk-h.com/adobesensei/>.
Tomohide Furusawa et al., "Automatic coloring of manga by convolution neuralnetwork using color features as input", DEIM Forum 2017, Mar. 7, 2017, <http://dbevent.jpn.org/deim2017/papers/188.pdf>.
Lllyasviel, "Style2pants V4", Github, <https://github.com/lllyasviel/style2paints>.
Mit Shah et al., "Reference Constrained Cartoon Colorization", 2017, The University of Texas at Austin Computer Science, <https://pdfs.semanticscholar.org/84d3/dd8da36d8002f8d8d33d244d440035f85f17.pdf>.
Patsorn Sangkloy et al.,"Scribbler: Controlling Deep Image Synthesis with Sketch and Color", arXiv, Dec. 5, 2016, <https://arxiv.org/pdf/1612.00835.pdf>.
Tomohide Furusawa, "Coloring black-and-white cartoons with Deep Learning ~ Using reference images ~", Dec. 26, 2017, dwango on GitHub, <https://dwango.github.io/articles/comicolorization/>.
Office Action dated Aug. 6, 2020, in U.S. Appl. No. 16/135,627 (US 2019-0087982).
Office Action dated Dec. 18, 2020 in U.S. Appl. No. 16/135,627 (US 2019-0087982).
Kataoka et al., "Automatic Coloring of Manga Images Using Hostile Networks in Deep Learning", Information Processing IPSJ SIG Technical Report, vol. 2017-CVIM-206, No. 6, (2017), fifteen (15) pages.
Office Action dated Aug. 2, 2021, in U.S. Appl. No. 16/135,627 (US 2019-0087982).
Wenqi Xian et al., "TextureGAN: Controlling Deep Image Synthesis with Texture Patches" (Version 1), p. 1:2—1:10 (2017) Available online, URL: https://arxiv.0rg/pdf/1706.02823v1.pdf (Jun. 9, 2017).
Wenqi Xian et al., "TextureGAN: Controlling Deep Image Synthesis with Texture Patches" (Version 2), pp. 1-10 (2017) Available online, URL: https://arxiv.org/pdf/1706.02823v2.pdf (Dec. 23, 2017).
Notice of Allowance issued on Nov. 22, 2021, in U.S. Appl. No. 16/135,627 (US 2019-0087982).
Cheng et al., "Deep Colorization", 2015 IEEE International Conference on Computer Version (ICCV), pp. 415-423, Dec. 7-13, 2015.
Ishikawa, "Colorizing Black and White Images with Artificial Intelligence", Image Laboratory, vol. 28, No. 10, pp. 14-21, Oct. 10, 2017.
Nakajima, "Controlling Artificial Intelligence on PC" IMPRESS Co. Ltd., pp. 132-136, Aug. 11, 2017.

* cited by examiner

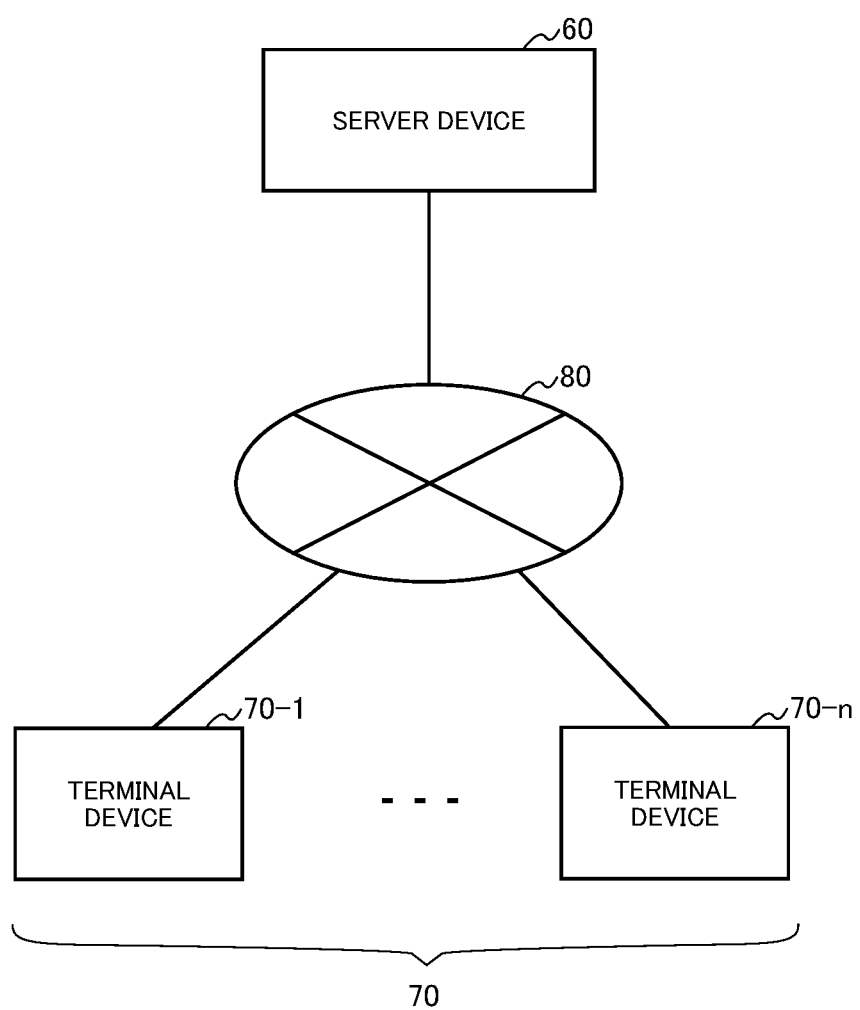

INFORMATION PROCESSING APPARATUS FOR COLORING AN IMAGE, AN INFORMATION PROCESSING PROGRAM FOR COLORING AN IMAGE, AND AN INFORMATION PROCESSING METHOD FOR COLORING AN IMAGE

CROSS-REFERENCE TO RELATED APPLICATIONS

This application claims the benefit of and priority to Japanese Patent Application No. 2018-013489, filed on Jan. 30, 2018, the entire contents of which are incorporated herein by reference.

TECHNICAL FIELD

Embodiments of the present disclosure relate to an information processing apparatus, an information processing program, and an information processing method, which are capable of automatically performing a coloring process using reference information with respect to a designated area of image data.

BACKGROUND

In recent years, machine learning using a multilayered neural network called deep learning has been applied in various fields. Since the utilization is also prominent in the field of image processing such as image recognition or image generation, remarkable achievements can be obtained.

For example, according to automatic colorization of black-and-white photographs by learning of global features and local features using deep network, Risa Iizuka, Simosela Edgar, and Hiroshi Ishikawa (http://hi.cs.waseda.ac.jp/~iizuka/projects/colorization/ja/), a process of automatically colorizing black-and-white photographs is realized by deep network, and a process of coloring black-and-white photographs is realized by machine learning.

As in automatic colorization of black-and-white photographs by learning of global features and local features using deep network, Risa Iizuka, Simosela Edgar, and Hiroshi Ishikawa (http://hi.cs.waseda.ac.jp/~iizuka/projects/colorization/ja/), a coloring process on image data may require a mechanism for performing the same coloring process as reference information by using reference information of a specific image or the like. For example, at the production site of color cartoon or animation, it is desired to perform coloring on a certain character based on reference information A, but it is desired to perform coloring on another character based on reference information B. As such, there is a need to perform coloring based on different reference information even in one piece of image data. Conventionally, a coloring process or the like for each character has been manually performed while confirming reference information. However, in the case of work by a human hand, there is a problem that a number of sheets cannot be handled in a limited time. Therefore, there has been a need for a mechanism capable of automatically performing a coloring process using reference information with respect to a designated area.

SUMMARY

Embodiments of the present disclosure have been made in view of the above-described problems, and it is an object of the present disclosure to provide an information processing apparatus, an information processing program, and an information processing method, which are capable of performing a coloring process using reference information with respect to a designated area. The terms "learned model" and "trained model" as used in the present disclosure to describe various embodiments may be used interchangeably with each other. Similarly, the terms "learned" and "trained" as used in the present disclosure to describe various embodiments may be used interchangeably with each other.

An information processing apparatus according to some embodiments of the present disclosure includes: a target image data acquisition unit configured to acquire target image data to be subjected to coloring; an area designation unit configured to designate an area to be subjected to coloring by using reference information in the target image data; a reference information selection unit configured to select reference information to be used for an area designated by the area designation unit (hereinafter, a designated area); and a coloring processing unit configured to perform a coloring process on the designated area by using the reference information selected by the reference information selection unit, based on a learned model for coloring which has been previously learned in the coloring process using the reference information.

In addition, in the information processing apparatus according to some embodiments of the present disclosure, the area designation unit is configured to determine whether a predetermined object is included in the target image data by an image recognition process and, when the object is included, and extract an area including the object as the designated area.

In addition, in the information processing apparatus according to some embodiments of the present disclosure, the reference information selection unit is configured to determine an object included in the designated area by performing an image recognition process on the designated area, and extract reference information suitable for the designated area based on the determination result.

An information processing program according to some embodiments of the present disclosure causes a computer to realize: a target image data acquisition function of acquiring target image data to be subjected to coloring; an area designation function of designating an area to be subjected to coloring by using reference information in the target image data; a reference information selection function of selecting reference information to be used for an area designated by the area designation function (hereinafter, a designated area); and a coloring process function of performing a coloring process on the designated area by using the reference information selected by the reference information selection function, based on a learned model for coloring which has been previously learned in the coloring process using the reference information.

In addition, an information processing method according to some embodiments of the present disclosure includes: a target image data acquisition step of acquiring target image data to be subjected to coloring; an area designation step of designating an area to be subjected to coloring by using reference information in the target image data; a reference information selection step of selecting reference information to be used for an area designated in the area designation step (hereinafter, a designated area); and a coloring process step of performing a coloring process on the designated area by using the reference information selected in the reference information selection step, based on a learned model for coloring which has been previously learned in the coloring process using the reference information.

An information processing apparatus according to some embodiments of the present disclosure includes: a target image data input form display unit configured to display, on a display screen, a form area for allowing a user to input target image data; a target image display unit configured to display an image indicated by the input target image data in a target image display area provided on the display screen; a designated area display unit configured to receive a designation of a designated area that is an area in which coloring using reference information is performed on the target image data, and superimpose and display a line indicating the designated area on the image indicated by the target image data displayed in the target image display area; and a designated area colored image display unit configured to receive the selection of the reference information for the designated area and display an image indicated by a colored image data, which is obtained by performing a coloring process using the reference information with respect to the image data included in the designated area, in a designated area colored image display area provided on the display screen, based on a learned model for coloring which has been previously learned.

In addition, the information processing apparatus according to some embodiments of the present disclosure includes a reference information candidate display unit configured to determine an object included in the designated area by performing an image recognition process on image data included in the designated area upon the selection of the reference information, and when reference information suitable for the designated area is extracted based on the determination result, display at least one or more pieces of the extracted reference information in a reference information candidate display area provided on the display screen, wherein a user is allowed to select one piece of the reference information from at least one or more reference information candidates displayed in the reference information candidate display area.

BRIEF DESCRIPTION OF DRAWINGS

FIG. 3 is a block diagram illustrating an example of the system configuration of the automatic coloring processing apparatus;

FIG. 8A and FIG. 8B are explanatory diagrams illustrating an example of a display screen displaying a graphical user interface as an automatic coloring processing tool according to a second embodiment of the present disclosure, wherein FIG. 8A illustrates a display screen when target image data is input, and FIG. 8B illustrates a display screen after area designation for target image data is performed; and FIG. 9A and FIG. 9B are explanatory diagrams illustrating an example of a display screen displaying a graphical user interface as an automatic coloring processing tool according to the second embodiment of the present disclosure, wherein FIG. 9A illustrates a display screen after a coloring process for a designated area is performed, and FIG. 9B illustrates a display screen after a coloring process for an entire area is performed.

DETAILED DESCRIPTION

The terms "learned model" and "trained model" as used in the present disclosure to describe various embodiments may be used interchangeably with each other. Similarly, the terms "learned" and "trained" as used in the present disclosure to describe various embodiments may be used interchangeably with each other.

First Embodiment

Figure 1:
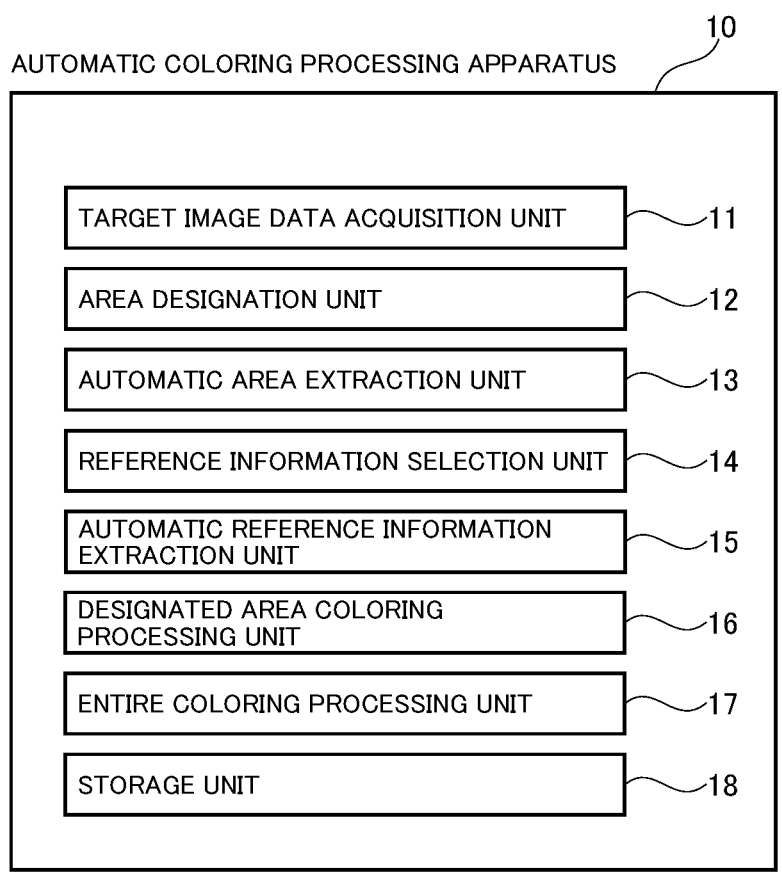
FIG. 1 is a block diagram illustrating a configuration of an automatic coloring processing apparatus according to a first embodiment of the present disclosure.

Hereinafter, an example of an automatic coloring processing apparatus according to a first embodiment of the present disclosure relating to an information processing apparatus will be described with reference to the drawings. FIG. 1 is a block diagram illustrating a configuration of an automatic coloring processing apparatus 10 according to the first embodiment of the present disclosure. As illustrated in FIG. 1, the automatic coloring processing apparatus 10 may include at least a target image data acquisition unit 11, an area designation unit 12, an automatic area extraction unit 13, a reference information selection unit 14, an automatic reference information extraction unit 15, a designated area coloring processing unit 16, an entire coloring processing unit 17, and a storage unit 18. The storage unit 18 may be implemented with EPROM, EEPROM, SDRAM, and flash memory devices, CD ROM, DVD-ROM, or Blu-Ray® discs and the like. At least one or more of the target image data acquisition unit 11, the area designation unit 12, the automatic area extraction unit 13, the reference information selection unit 14, the automatic reference information extraction unit 15, the designated area coloring processing unit 16, and the entire coloring processing unit 17 may be implemented with a special circuit (e.g., processing circuitry of a FPGA or the like), a subroutine in a program stored in memory (e.g., EPROM, EEPROM, SDRAM, and flash memory devices, CD ROM, DVD-ROM, or Blu-Ray® discs and the like) and executable by a processor (e.g., CPU, GPU and the like), or the like. In the present disclosure, "processing circuitry" refers to FPGA, CPU, GPU or other processing devices implemented on electronic circuits.

Figure 2:
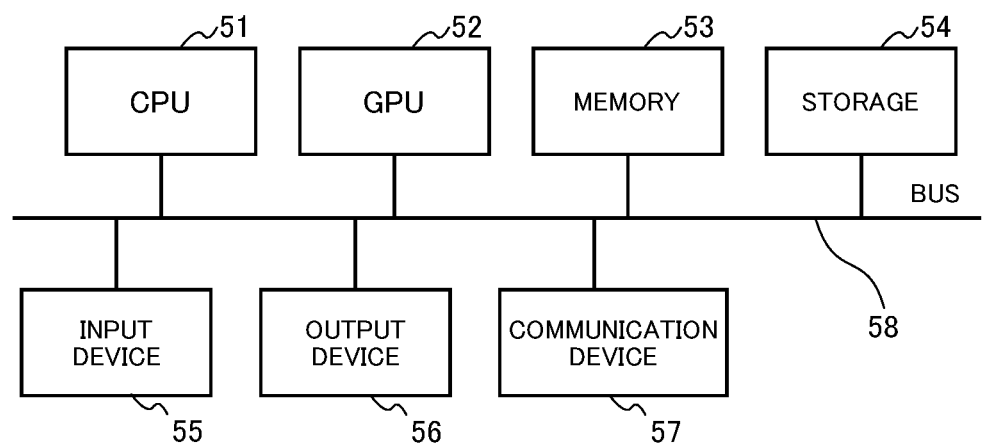
FIG. 2 is a block diagram illustrating a hardware configuration for realizing the automatic coloring processing apparatus.

Furthermore, the automatic coloring processing apparatus 10 may be an apparatus implemented as a dedicated machine, or an apparatus implemented by a general computer. FIG. 2 is a block diagram illustrating a hardware configuration for realizing the automatic coloring processing apparatus 10. As illustrated in FIG. 2, the automatic coloring processing apparatus 10 includes a central processing unit (CPU) 51, a graphics processing unit (GPU) 52, a memory 53, and a storage 54 such as a hard disk drive (HDD) or a solid state drive (SSD), which are normally included in a general computer. In addition, the automatic coloring processing apparatus 10 includes an input device 55 such as a mouse or a keyboard, an output device 56 such as a display or a printer, and a communication device 57 for connecting with a communication network, which are connected via a bus 58. Furthermore, the automatic coloring processing apparatus 10 according to the first embodiment of the present disclosure may be realized or implemented by at least one or more arithmetic processing devices or arithmetic processing circuits. The arithmetic processing device or the arithmetic processing circuit may realize or implement a process in the configuration of each part of the automatic coloring processing apparatus 10 using a variety of hardware including the CPU illustrated in FIG. 2. For example, referring to FIG. 1 and FIG. 2, the storage unit 18 may be implemented with the memory 53 or the storage 54. At least one or more of the target image data acquisition unit 11, the area designation unit 12, the automatic area extraction unit 13, the reference information selection unit 14, the automatic reference information extraction unit 15, the designated area coloring processing unit 16, the entire coloring processing unit 17 may be implemented with a subroutine in a program stored in the memory 53 or the storage 54 and executable by a processor (e.g., CPU 51, GPU 52 and the like).

FIG. 3 is a block diagram illustrating an example of the system configuration of the automatic coloring processing apparatus 10. In FIG. 3, a server device 60 and a terminal device 70 (or a plurality of terminal devices 70-1 to 70-n) may be configured to be mutually connectable via a communication network 80. For example, the server device 60 in FIG. 3 may function as the automatic coloring processing apparatus 10, and may be used as the automatic coloring processing apparatus 10 through the connection from any one of the plurality of terminal devices 70-1 to 70-n to the server device 60 via the communication network. At that time, a graphical user interface program for using the automatic coloring processing apparatus 10 may be installed on the terminal device 70. In some embodiments, a graphical user interface program on the server may be used via a browser. In some embodiments, at least one of the terminal device 70 and the server may be an information processing apparatus having a function of displaying various displays as a graphical user interface.

In some embodiments, all the components of the automatic coloring processing apparatus 10 described below need not be provided in the same apparatus, and a part of the components may be provided in another apparatus. For example, the automatic coloring processing apparatus 10 may use a configuration provided in another apparatus while performing communication, so that apart of the configurations is provided in any one of the server device 60 and the plurality of terminal devices 70-1 to 70-n, which are connectable via the communication network. In some embodiments, the server device 60 is not limited to a single server device, and a plurality of server devices may be used. In some embodiments, the learned model may be stored in an apparatus such as the automatic coloring processing apparatus 10. In some embodiments, the learned model to be described later may be distributed in the server device 60, the plurality of terminal devices 70-1 to 70-n, and the like, or may be configured to be used by connecting to each device provided with a learned model via a communication network. That is, if the learned model stored by some learned model storage means (e.g., EPROM, EEPROM, SDRAM, and flash memory devices, CD ROM, DVD-ROM, Blu-Ray® discs, HDD, SSD and the like) can be used, it does not matter whether the learned model storage means is provided by the automatic coloring processing apparatus 10 itself or another apparatus.

Referring to FIG. 1, the target image data acquisition unit 11 may have a function of acquiring target image data to be subjected to a coloring process. Here, the target image data refers to at least one of image data that leaves room for coloring, such as line drawing data rendered by expressing a line segment by binary or grayscale of black and white, image data in which shadows are expressed by grayscale like black-and-white photographs, a tone pasted image to which a tone is pasted, a partially colored image in which coloring is partially performed, and an image that has been entirely colored (in this case, color repainting is assumed). In addition, the coloring process refers to a process of coloring a portion or the entirety of the target image data at which coloring can be performed. In addition, the coloring process may be a process of performing coloring only on an uncolored portion, or may be a process of changing a color of a portion at which coloring has been already performed while performing coloring on an uncolored portion.

Figure 4A:
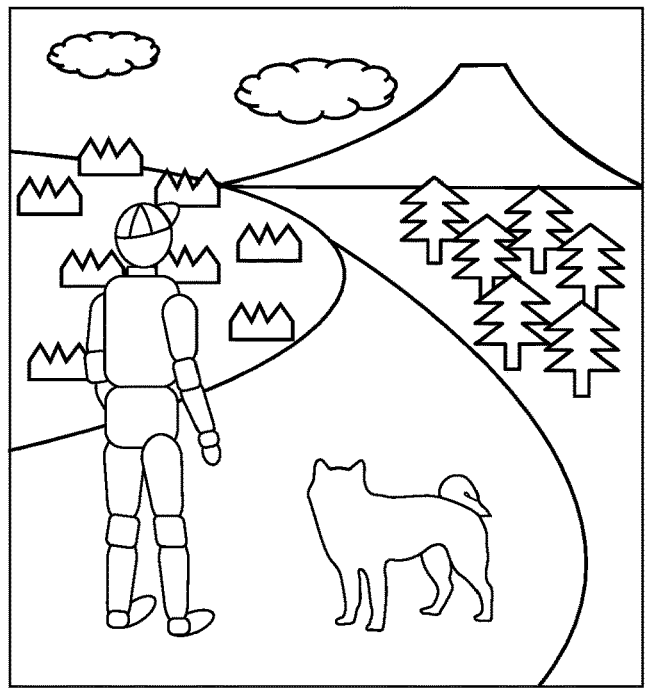
FIG. 4A and FIG. 4B are explanatory diagrams illustrating an example of target image data and an example in which area designation is performed on the target image data.
Figure 4B:
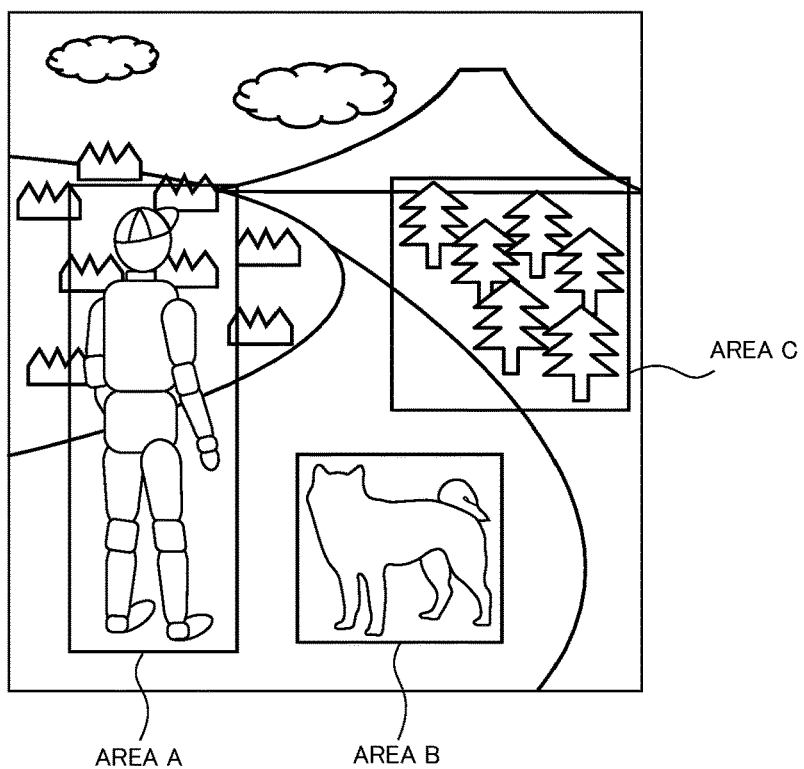

The area designation unit 12 (see FIG. 1) may have a function of designating an area to be subjected to coloring using reference information with respect to target image data. As a method of designating an area, for example, a user may perform area designation on the target image data displayed on the display screen by using an input device such as a mouse or a touch panel. FIG. 4A and FIG. 4B are explanatory diagrams illustrating an example of target image data and an example in which area designation is performed on the target image data. FIG. 4A illustrates target image data. FIG. 4B illustrate a state in which three areas, that is, area A, area B, and area C, are designated with respect to the target image data illustrated in FIG. 4A. As illustrated in FIG. 4B, the present disclosure is not limited to the case of designating an area by a rectangle, but any area designation can be adopted as long as a closed area can be designated.

In some embodiments, the designation of the area in the area designation unit 12 may also include a rough area designation by the user. That is, it is unnecessary to designate a closed area like a rectangular bounding box. In some embodiments, such rough area designation may be performed using at least one of a method of allowing a user to roughly designate a vicinity with respect to target image data displayed on a graphical user interface (GUI), a method of designating only a portion that becomes a center point of an area, and a method of designating an area by filling in an unclosed handwritten circle. When the user performs such rough area designation, a process may be performed such that a predetermined range centered on a designated location is extracted by a rectangular closed area and internally designated as a closed area. In some embodiments, a learned model may be constructed such that rough area designation is adopted and a coloring process is performed even in the rough area designation.

In addition, in a case in which the designation of the area in the area designation unit 12 is rough area designation, the influence of the coloring process using the reference information may be configured like normal distribution. For example, the influence of the reference information may be reduced as the distance from the designated point increases. In order to achieve such a configuration, after a coloring process using reference information is internally performed on a predetermined closed area, the influence amount reflecting the coloring contents may be reduced as the distance from the center point increases and may be reflected on target image data. Also, in order to achieve the above configuration, the coloring process may be performed based on the learned model that has been learned, such that the influence of reference information is reduced as the distance from the designated point increases.

Referring back to FIG. 1, the automatic area extraction unit 13 may have a function of determining whether a predetermined object is included in target image data by an image recognition process and, when it is determined that the object is included, automatically extracting an area including the object as a designated area. Here, the image recognition process may be a process for specifying the object included in the target image data. In some embodiments, the image recognition process may be any methods as long as the object included in the target image data can be specified. For example, the image recognition process may be a method of performing an image recognition process using a learned model for image recognition which has been learned in advance with respect to specifying an object using a neural network. In some embodiments, the learned model for image recognition may be one model so as to be usable for specifying various objects. In some embodiments, a plurality of learned models for image recognition which are learned as a model specialized for a process of determining an object to be specified may be prepared for each object, and a learned model for image recognition corresponding to the object may be used when a user designates the object to be determined. When the object is determined by the learned model for image recognition, an area including the object may be extracted as a designated area. The range of the designated area can be variously determined, for example, by a method of extracting a smallest rectangular area (bounding box) including the object as the designated area. In some embodiments, a method of extracting the outline of the object as the designated area may be used.

In addition, the designated area extracted by the automatic area extraction unit 13 (see FIG. 1) is not limited to a method of discriminating and designating an area by a binary value, such that the designated area is set to 1 and a portion other than the designated area is set to 0. The designated area may be configured to be designated with a mask of a continuous value of 0 to 1. For example, in the case of specifying the object included in the target image data by the image recognition process, an area such as "a portion at which an expectation value of character A is high" may be designated by expressing such an area more accurately, for example, using a continuous value than a binary value. In some embodiments, the high probability portion of character A may have a value close to 1 such as 0.9 or 0.8. In some embodiments, if the designated area is expressed by using a continuous value of 0 to 1, as the distance from the high probability portion increases, the probability of being character A may be reduced so as to have a value close to 0 such as 0.4 or 0.3. In addition, it is possible that designated areas for specifying different objects may be overlapped and designated, such that the probability of being character A is 0.5 and the probability of being character B is 0.6. A method of expressing a designated area with a mask of a continuous value of 0 to 1 can also be applied to a case in which rough area designation is received by the area designation unit 12.

Furthermore, the area designation unit 12 and the automatic area extraction unit 13 can extract a designated area as long as either one of the area designation unit 12 and the automatic area extraction unit 13 has configurations for extracting a designated area. For example, the area designation unit 12 may be configured to automatically extract a designated area designated by the user, in which case the automatic area extraction unit 13 is unnecessary. However, it can be said that it is preferable to include both the area designation unit 12, which is configured so that the user designates the area, and the automatic area extraction unit 13, which can automatically extract the designated area.

The reference information selection unit 14 (see FIG. 1) may have a function of selecting reference information to be used for each designated area that is designated by the area designation unit 12 or the automatic area extraction unit 13. In order to realize desired coloring of the object included in the designated area, reference information to be used for coloring the object included in the designated area may be selected and applied. Here, the reference information refers to colored image data composed of information of coloring desired to be used for coloring the object included in the designated area, or a feature amount extracted from the colored image data. The reference information may be used in such a manner that the user selects colored image data or the like which has been colored as desired with respect to the object in the designated area. If there are a plurality of designated areas, the selection of the reference information in the reference information selection unit 14 may be performed so that different reference information can be selected for each designated area. For example, as illustrated in FIG. 4B, in a state in which the three areas, that is, the area A, the area B, and the area C, are designated with respect to the target image data illustrated in FIG. 4A, reference information suitable for each designated area may be selected such that reference information of a specific character (e.g., a specific person character type) is selected for the area A, reference information of a specific dog type is selected for the area B, and reference information of a specific tree type is selected for the area C.

The automatic reference information extraction unit 15 (see FIG. 1) may have a function of determining an object included in the designated area by performing an image recognition process on the designated area, and automatically extracting reference information suitable for the designated area based on the determination result. Here, the image recognition process refers to a process for specifying the object included in the designated area, or any methods as long as the object included in the designated area can be specified. For example, the image recognition process may be a method of performing an image recognition process using a learned model for image recognition which has been learned in advance with respect to specifying an object using a neural network. In some embodiments, the learned model for image recognition may learn one model so as to be usable for specifying various objects. In some embodiments, a plurality of learned models for image recognition which are learned as a model specialized for a process of determining an object to be specified may be prepared for each object, and a learned model for image recognition corresponding to the object may be used when a user designates the object to be determined. Furthermore, the learned model for image recognition used for the image recognition process in the automatic area extraction unit 13 and the learned model for image recognition used for the image recognition process in the automatic reference information extraction unit 15 may use the same model. In some embodiments, since the former is a process of determining the object from the entire target image data and the latter is a process of determining the object in the designated area, a learned model for image recognition may be provided for each case.

When the object is specified by the image recognition process, reference information suitable for coloring the object may be extracted. The extraction of the reference information may be extraction from any data source. However, for example, a method of extracting optimum (e.g., most suitable) reference information from a prestored reference information database may be used. Furthermore, the extraction of the reference information may be performed by retrieval and extraction from another device, a server device, or the like connectable via a communication network. For specific extraction of reference information, for example, a method of setting a tag to an object included in a designated area and extracting reference information having a common tag based on the tag may be used. A plurality of tags can be set to the same object, for example, a tag of a higher-level concept such as "dog" and a tag of a lower-level concept such as "Shiba Inu" or "Golden Retriever", and a user may select the tag of the basis on which the reference information is extracted.

When the reference information is automatically extracted, one piece of the reference information extracted by the learned model for image recognition may be automatically selected. However, one or more pieces of reference information extracted by the learned model for image recognition may be presented to the user so that the user determines the reference information. For example, in a graphical user interface (GUI) for displaying on a display of a device operated by a user, when the automatic extraction of the reference information with respect to the designated area is performed by, for example, pressing an automatic extraction execution button, it is possible to present candidate reference information to the user and select candidate reference information by performing automatic extraction by the learned model for image recognition and providing a reference information candidate display area for displaying at least one piece of extracted reference information. The reference information candidate display area may be displayed by a method of displaying thumbnails as a list, or a method of displaying one by one by page switching.

Furthermore, the reference information selection unit 14 and the automatic reference information extraction unit 15 (see FIG. 1) can realize the coloring process for the designated area as long as either one of the reference information selection unit 14 and the automatic reference information extraction unit 15 has configurations for performing coloring process for the designated area. For example, the reference information selection unit 14 may be configured to automatically extract reference information selected by the user, in which case the automatic reference information extraction unit 15 is unnecessary. However, it can be said that it is preferable to include both the reference information selection unit 14, which is configured so that the user selects the reference information, and the automatic reference information extraction unit 15, which can automatically extract the reference information.

Figure 5:
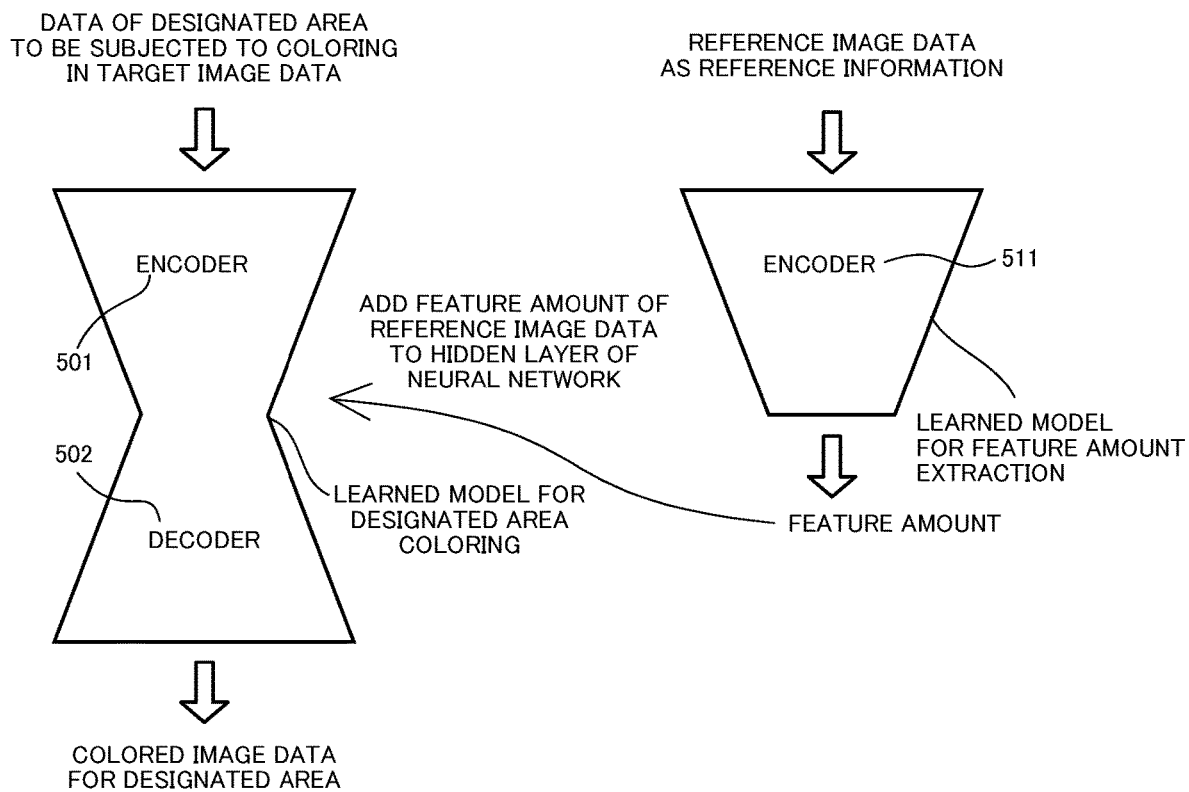
FIG. 5 is an explanatory diagram illustrating a learned model for designated area coloring.

The designated area coloring processing unit 16 (see FIG. 1) may have a function of performing a coloring process using reference information with respect to a designated area of target image data based on a learned model for designated area coloring which has been previously learned about a coloring process using reference information for a designated area. Here, the coloring process using the reference information may be a coloring process in which the coloring tendency of the colored image data according to the reference information is reflected to the coloring of the designated area. The extent to which the degree of coincidence of the reference information and the coloring process to the designated area is obtained may depend on the configuration and learning process of the neural network as the learned model for the designated area coloring used for the coloring process. FIG. 5 is an explanatory diagram illustrating a learned model for designated area coloring. As illustrated in FIG. 5, the input of data of a designated area to be subjected to coloring among target image data to an input layer of a model constituted by a neural network and the output of colored image data for the designated area from an output layer may be learned. In some embodiments, referring to FIG. 5, the input data input to the input layer of the model may be processed by an encoder 501, and the colored image data for the designated area may be processed by a decoder 502 before being output from the output layer of the model. However, as an example, a feature amount extracted from reference image data as reference information may be added to a hidden layer of the model, and the model is learned so that the same coloring as the reference information is realized. In some embodiments, referring to FIG. 5, the reference image data as reference information may be processed by an encoder 511 before being added to the hidden layer of the model. In addition, coefficients when adding the feature amount of the reference information may also be objects of learning. In addition, the learned model for feature amount extraction constituted by the neural network for extracting the feature amount from the reference image data may be learned. For the learned model for feature amount extraction, a learned model for feature amount extraction used for other purposes may also be adopted. In addition, when the extracted feature amount is used as the reference information, the directly extracted feature amount may be added to the hidden layer of the learned model for designated area coloring, without using the learned model for feature amount extraction. According to the learned model for designated area coloring on which appropriate learning has been performed, it is possible to perform the coloring process similar to the coloring of the reference image data as the reference information with respect to the image data of the designated area. In the above example, the learned model for designated area coloring in which learning is performed by adding the feature amount of the reference information to the hidden layer of the model is used, but a learned model for designated area coloring in which learning is performed by adding the reference information itself or the feature amount of the reference information to the input layer of the model may also be used. If the coloring process in which the coloring tendency of the colored image data as the reference information is reflected to the coloring of the designated area can be realized, any layers of the model may be used as an input position of the reference information with respect to the learned model for designated area coloring. Furthermore, as an advantage when the feature amount is input to the hidden layer of the model, there is an effect that the inputting to the hidden layer can reduce the amount of calculation when a lot of feature amounts is input. On the other hand, a method of inputting to the input layer of the model may be effective when the reference information is reliably used for the coloring process. In the case of emphasizing the quality, a method of inputting information to both the hidden layer and the input layer may be used.

Figure 6:
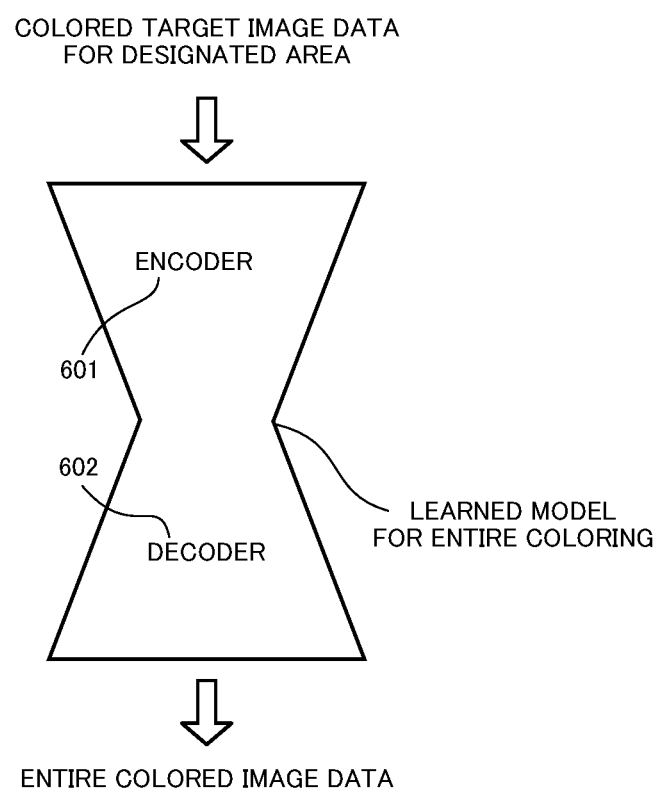
FIG. 6 is an explanatory diagram illustrating a learned model for entire coloring.

The entire coloring processing unit 17 (see FIG. 1) may have a function of performing the coloring process on the entire target image data, on which the coloring process has been completed on the designated area in the designated area coloring processing unit 16, based on the learned model for entire coloring which has been previously learned. FIG. 6 is an explanatory diagram illustrating the learned model for entire coloring. As illustrated in FIG. 6, the input of target image data in which the coloring process has been completed on the designated area with respect to the input layer of the model constituted by the neural network and the output of the colored image data from the output layer by performing the coloring process on the entire target image data may be learned. That is, in the learning of the learned model for entire coloring, a plurality of sets of training data may be prepared and used for learning. In some embodiments, a set of training data may include test data in which some areas are colored and the other areas are uncolored and correct answer image data in which the coloring of some areas of the test data is left intact and the coloring is performed on the other areas. Referring to FIG. 6, in some embodiments, the input data input to the input layer of the model may be processed by an encoder 601, and the colored image data on the entire target image data may be processed by a decoder 602 before being output from the output layer of the model. At least one or more of the encoder 501, the decoder 502, the encoder 511 (see FIG. 5), the encoder 601 and the decoder 602 (see FIG. 6) may be implemented with a special circuit (e.g., processing circuitry of a FPGA or the like), a subroutine in a program stored in memory (e.g., EPROM, EEPROM, SDRAM, and flash memory devices, CD ROM, DVD-ROM, or Blu-Ray® discs and the like) and executable by a processor (e.g., CPU, GPU and the like), or the like.

The storage unit 18 (see FIG. 1) may have a function of storing data for various processes performed in the automatic coloring processing apparatus 10, including the processes performed in the target image data acquisition unit 11, the area designation unit 12, the automatic area extraction unit 13, the reference information selection unit 14, the automatic reference information extraction unit 15, the designated area coloring processing unit 16, the entire coloring processing unit 17, and the like, and the data obtained as the results of the processes. In addition, various learned models obtained by performing learning in advance may be stored in the storage unit 18.

Figure 7:
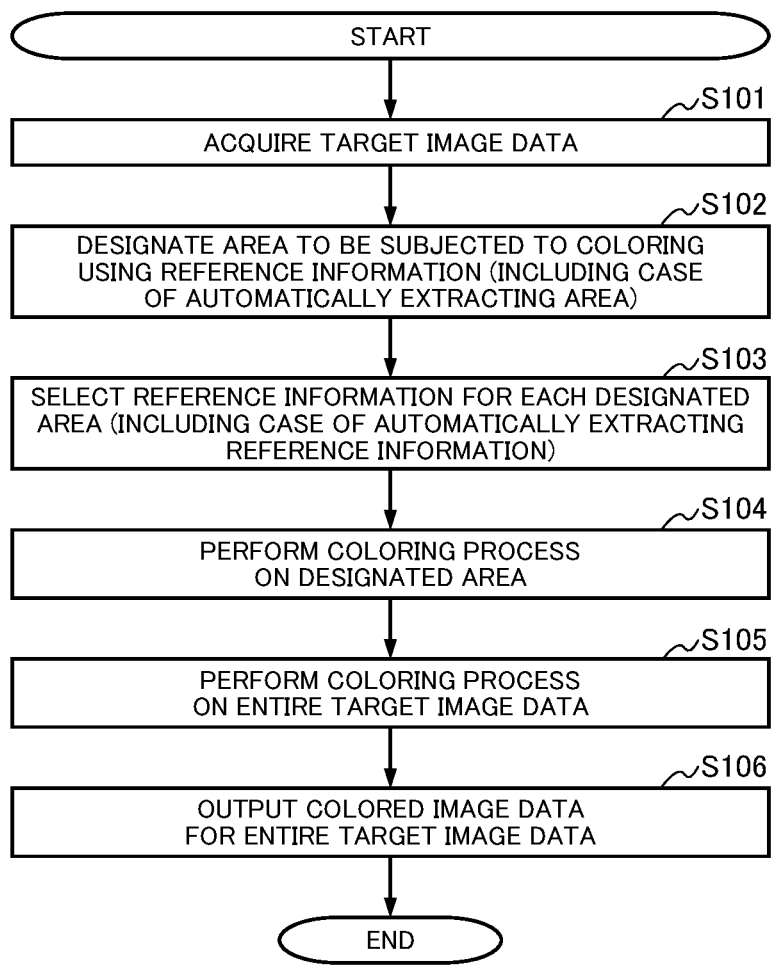
FIG. 7 is a flowchart illustrating a flow of a coloring process in the automatic coloring processing apparatus according to the first embodiment.

Next, the flow of the coloring process in the automatic coloring processing apparatus 10 of the present example will be described. FIG. 7 is a flowchart illustrating the flow of the coloring process in the automatic coloring processing apparatus 10 according to the first embodiment. The coloring process in the automatic coloring processing apparatus 10 may be started by acquiring target image data (step S101). For example, the target image data may be acquired by a user selection. Next, a designation of an area to be subjected to coloring using reference information may be received (step S102). In the designation of the area, the user may determine the range of the designated area, or the designated area may be automatically extracted. Then, selection of the reference information may be received for each designated area (step S103). In the selection of the reference information, the user may determine the reference information for the designated area, or the reference information may be automatically extracted.

After the selection of the reference information is received, the coloring process may be performed on the image data in the designated area by using the reference information (step S104). The coloring on the designated area may be performed based on the learned model for designated area coloring which has been previously learned. Finally, the coloring process may be performed on the entire target image data on which the coloring process has been completed on the designated area (step S105). In some embodiments, the coloring on the entire target image data may be performed based on the learned model for entire coloring which has been previously learned. Then, the colored image data on which the coloring process has been completed with respect to the entire target image data may be output (step S106), and the process is ended.

As described above, according to the automatic coloring processing apparatus 10 of the first embodiment, it is possible to receive the designation of the area to be subjected to the coloring using the reference information with respect to the target image data, to receive the selection of the reference information with respect to the designated area, and to perform the coloring process using the reference information with respect to the image data in the designated area. For example, if the colored image data of a character (e.g., a person, a dog, or trees) is used as the reference information with respect to the frequently appearing character in the coloring process of the cartoon or the animation, it is unnecessary to repeatedly perform the same coloring process by hand. Therefore, production efficiency of the cartoon or the animation can be improved.

Second Embodiment

Hereinafter, an information processing apparatus according to a second embodiment will be described with reference to the drawings. In the first embodiment, the automatic coloring processing apparatus 10 has been described. In the second embodiment, the information processing apparatus for providing the graphical user interface used when the automatic coloring processing apparatus 10 according to the first embodiment is used will be described. The information processing apparatus in the second embodiment will be described as providing the graphical user interface as the automatic coloring process tool. For example, a method of providing a server device functioning as the automatic coloring processing apparatus 10 according to the first embodiment and providing an automatic coloring process tool to a user who accesses the server device from a terminal device via a communication network can be considered. In such a case, the present disclosure is not limited to a case in which an automatic coloring process tool is provided to a terminal device by software of a package. It is also possible to provide an automatic coloring process tool by reading a graphical user interface (GUI) stored on a server by a browser or the like for displaying on a display of a terminal device and making it function. Furthermore, the automatic coloring process tool may be a tool used when a user uses the automatic coloring processing apparatus 10 according to the first embodiment. The automatic coloring process tool can be provided in various forms, for example, an independent program, a web browser, or a part of software package such as image editing software.

The automatic coloring process tool for using the automatic coloring processing apparatus 10 according to the first embodiment may preferably include an image data input form display unit, a target image display unit, a designated area display unit, a designated area colored image display unit, and an entire colored image display unit. The image data input form display unit may display, on the display screen, a form area for allowing the user to input the target image data. The target image display unit may display an image indicated by the input target image data in a target image display area provided on the display screen. The designated area display unit may receive a designation of a designated area that is an area in which coloring using reference information is performed on the target image data, and superimpose and display a frame line indicating the designated area on the image indicated by the target image data displayed in the target image display area. The designated area colored image display unit may receive the selection of the reference information for the designated area and display an image indicated by colored image data, which is obtained by performing a coloring process using the reference information with respect to the image data included in the designated area among the target image data, in a designated area colored image display area provided on the display screen, based on the learned model for designated area coloring which has been previously learned. The entire colored image display unit may display an image indicated by the colored image data, which is obtained by performing the coloring process on the entire target image data on which the coloring process has been completed with respect to the designated area, in an entire colored image display area provided on the display screen, based on the learned model for entire coloring which has been previously learned.

In addition, it is preferable that the automatic coloring process tool includes a reference information candidate display unit which determines an object included in the designated area by performing an image recognition process on the image data included in the designated area upon the selection of the reference information. In some embodiments, when the reference information suitable for the designated area is automatically extracted based on the determination result, the reference information candidate display unit may display at least one or more pieces of the automatically extracted reference information in a reference information candidate display area provided on the display screen, and the user may be allowed to select one piece of the reference information from at least one or more reference information candidates displayed in the reference information candidate display area. At least one or more of the image data input form display unit, the target image display unit, the designated area display unit, the designated area colored image display unit, the entire colored image display unit, and the reference information candidate display unit may be implemented with a special circuit (e.g., processing circuitry of a FPGA or the like), a subroutine in a program stored in memory (e.g., EPROM, EEPROM, SDRAM, and flash memory devices, CD ROM, DVD-ROM, or Blu-Ray® discs and the like) and executable by a processor (e.g., CPU, GPU and the like), the input device 55 such as a mouse or a keyboard (see FIG. 2), the output device 56 such as a display or a printer (see FIG. 2), and the communication device 57 for connecting with a communication network, which are connected via the bus 58 (see FIG. 2), or the like. In the present disclosure, "processing circuitry" refers to FPGA, CPU, GPU or other processing devices implemented on electronic circuits.

Figure 8A:
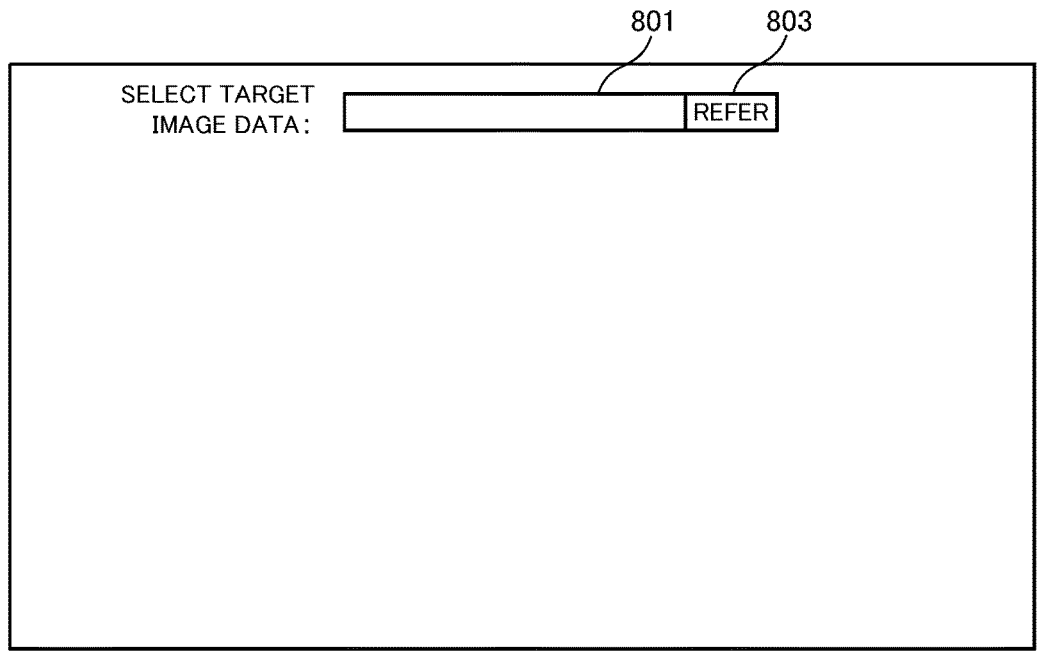
Figure 8B:
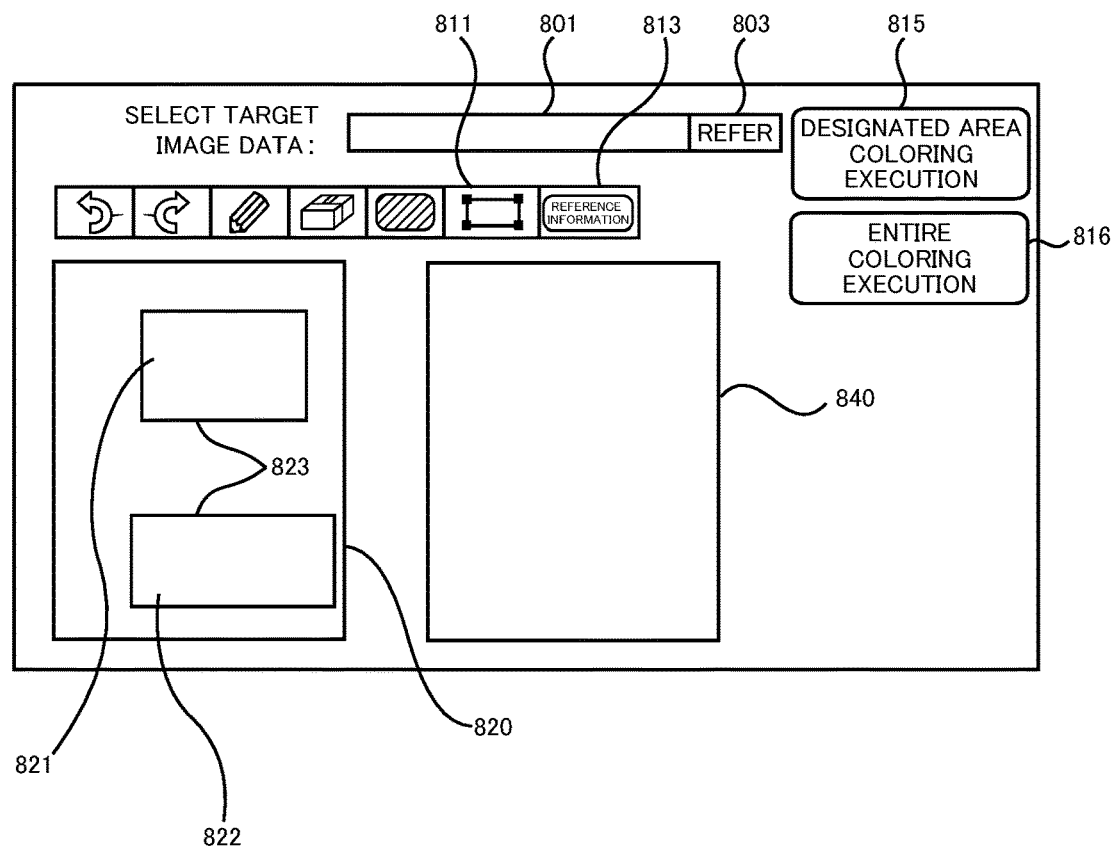

FIG. 8A and FIG. 8B are explanatory diagrams illustrating an example of a display screen displayed by a graphical user interface as an automatic coloring processing tool of the present example, wherein FIG. 8A illustrates a display screen when target image data is input, and FIG. 8B illustrates a display screen after area designation for target image data. In the case of providing the automatic coloring process tool from the server device to the terminal device, as illustrated in FIG. 8A, a target image data input form 801 which is a form area for allowing the user to input the target image data may be displayed on the display of the terminal device, for example, via the web browser or the like. In some embodiments, the target image data input form 801 may include a "refer" button 803 which displays a list of candidate image data so that the user can select the target image data from the list. In the target image data input form 801, the target image data may be input by a method of designating a path of a file as shown in FIG. 8A, but the present disclosure is not limited thereto. For example, the target image data input form may be a method of selecting target image data by drag-and-drop. Furthermore, in the example illustrated in FIG. 8A, the display screen refers to a screen displayed to the user when a GUI is provided by a graphical user interface program, a web browser, or the like. In some embodiments, the display screen may include any of the display screen generated by the server device and the display screen generated by the terminal device.

Referring to FIG. 8A and FIG. 8B, when the target image data is input by using the target image data input form 801, the image indicated by the input target image data may be displayed in a target image display area 820 provided on the display screen. Next, the designation of a designated area (e.g., an area 821 indicating designated area D, an area 822 indicating designated area E) that is the area to be subjected to coloring using the reference information with respect to the target image data is received. For the area designation, for example, a method of clicking an area designation icon 811 and then adjusting and designating the position and the range of the designated area by adjusting the size of the bounding box for area designation with respect to the image indicated by the target image data displayed in the target image display area 820 may be used. The designated location of the designated area may be plural. For the display of the designated area, for example, a frame line (for example, a frame line 823 in FIG. 8B) indicating the designated area may be superimposed and displayed on the image indicated by the target image data displayed in the target image display area. FIG. 8B illustrates a state in which the designated area D and the frame line 823 indicating the designated area E are superimposed and displayed on the image indicated by the target image data. In some embodiments, referring to FIG. 8B, the display screen may include a reference information selection icon 813, a designated area coloring execution button 815, an entire coloring execution button 816, and a colored image display area 840.

Figure 9A:
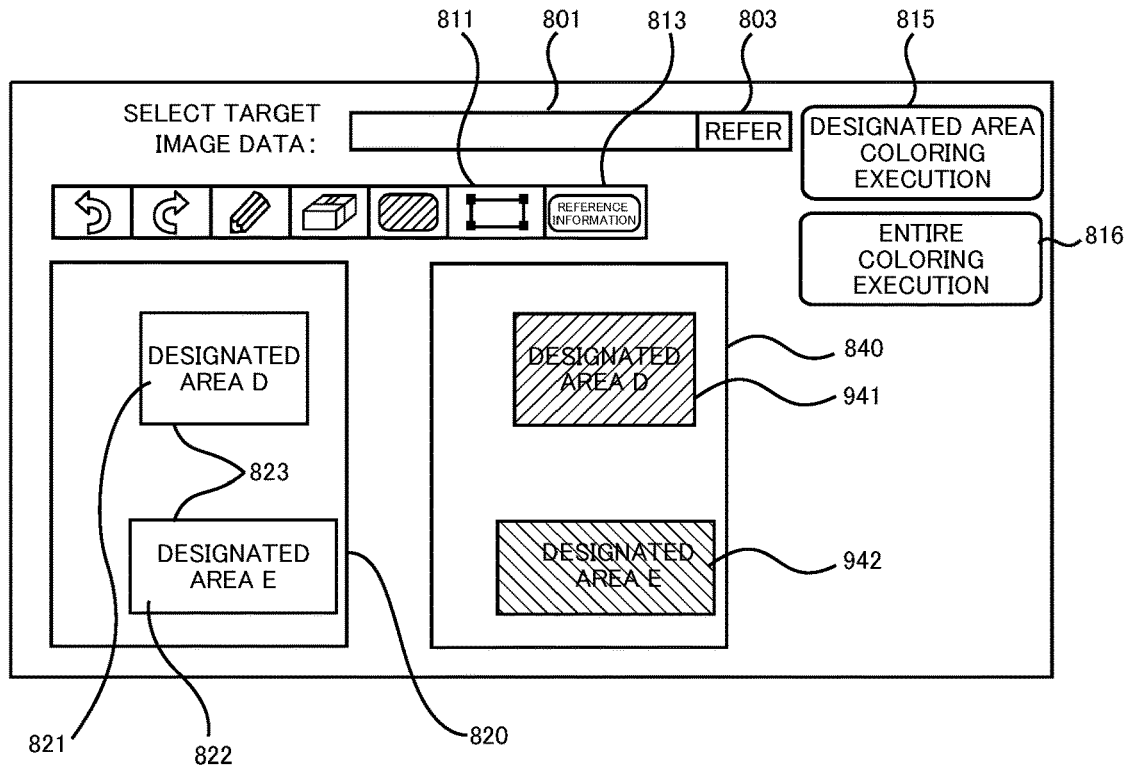
Figure 9B:
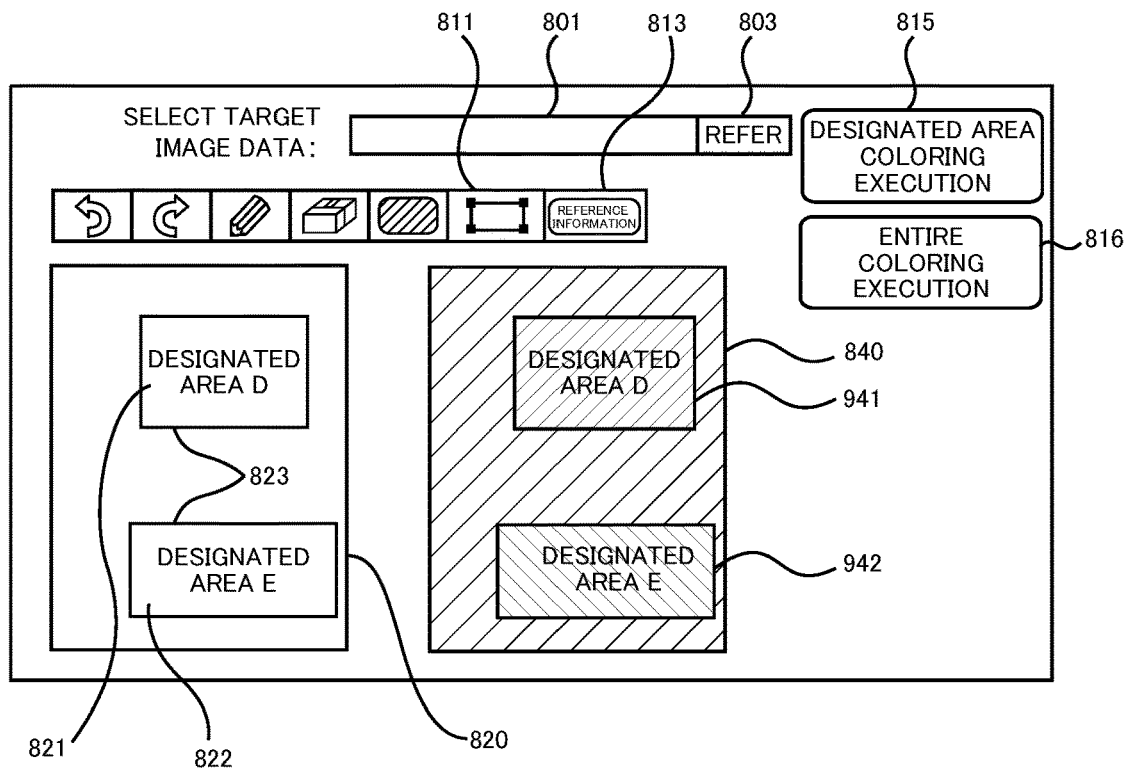

FIG. 9A and FIG. 9B are explanatory diagrams illustrating an example of a display screen displayed by a graphical user interface as an automatic coloring processing tool of the present example, wherein FIG. 9A illustrates a display screen after a coloring process for a designated area, and FIG. 9B illustrates a display screen after a coloring process for an entire area. After the designated area D (the area 821) and the designated area E (the area 822) are designated as illustrated in FIG. 8B, reference information to be used for the coloring process may be selected for each designated area. The selection of the reference information is performed by, for example, clicking the reference information selection icon 813 and then selecting the reference information and selecting the designated area as the application destination of the reference information. When there are a plurality of designated areas, reference information may be selected for each designated area. In addition, the selection of the reference information may be performed by specifying the object included in the designated area by performing the image recognition process on the image data in the designated area with the learned model for image recognition, and extracting reference information suitable for the specified object from the prestored reference information database. At this time, although illustration is omitted, a plurality of candidate image data as reference information may be extracted from the reference information database, a plurality of candidate image data may be displayed on the display screen, and the reference image to be applied to the user may be selected.

In a state in which the reference information for the designated area is selected, for example, when the designated area coloring execution button 815 provided on the display screen is selected by a mouse operation or the like, the coloring process may be performed on the image data included in the designated area by using the learned model for designated area coloring, and the result of the coloring process for the designated area may be displayed in the colored image display area 840 provided on the display screen. FIG. 9A illustrates a state in which the image indicated by the target image data in the state in which the coloring process is performed on the designated area D (area 941 in FIG. 9A) and the designated area E (area 942 in FIG. 9A) may be displayed in the colored image display area 840. Furthermore, in the example illustrated in FIG. 9A and FIG. 9B, the colored image display area 840 may be a display area which serves as both the designated area colored image display area and the entire colored image display area, but the designated area colored image display area and the entire colored image display area may be separately provided on the display screen.

In a state in which the coloring process for the designated area is completed, for example, when the entire coloring execution button 816 provided on the display screen is selected by a mouse operation or the like, the coloring process may be performed on the entire target image data on which the coloring process has been performed with respect to the designated area, based on the learned model for entire coloring, and the image indicated by the colored image data which has been colored with respect to the obtained image may be displayed in the colored image display area provided on the display screen. FIG. 9B further illustrates a state in which the image indicated by the colored image data after execution of the entire coloring process is displayed in the colored image display area with respect to the target image data in a state in which the coloring process is performed on the designated area D and the designated area E.

Since the automatic coloring process tool as described above performs the display of the image indicated by the target image data, the display of the frame line of the designated area, the display of the result of the coloring process on the designated area, and the display of the result of the coloring process on the entirety, the user can observe the original target image data and the colored image data on the designated area or the entire colored image data side by side. Therefore, it is possible to directly compare the modes of the images which change before and after the coloring process. In addition, since a plurality of candidates are displayed when reference information candidates are automatically extracted, it is possible to confirm and select the reference information desired by the user from the automatically extracted reference information candidates.

In the first and second embodiments, the coloring process for the designated area using reference information can be realized by adding the feature amount obtained from the reference information to the hidden layer of the learned model for designated area coloring, but in some embodiments, the feature amount is not necessarily needed. In some embodiments, tag information for distinguishing the reference information may be added to the hidden layer of the learned model for designated area coloring. If the learning of the learned model for designated area coloring is performed by inputting a code (e.g., numerical value of a predetermined number of digits) representing tag information to the hidden layer, it is possible to perform the coloring process on the designated area using reference information by merely inputting the tag information of the reference information to the hidden layer.

In the first and second embodiments, the two-step coloring process of performing the coloring process on the designated area with respect to the target image data and after that, performing the coloring process on the entire target image data has been described, but the coloring on the designated area and the coloring on the entire area may be realized by the 1-step coloring process by using the target image data and the reference information for the designated area as the input. In that case, it is possible to use the learned model for coloring which has been previously learned in the coloring process in one step. When the coloring process is performed in one step, upon learning the neural network used for coloring, a plurality of areas may be randomly created for the target image data among training data composed of target image data to be used for learning and correct answer image data (teacher data), and the learning may be performed by using, as a hint, the feature amount extracted from the image of the correct answer image data corresponding to the area or the correct image data of the area. In addition, as another method, when the coloring process is performed in two stages as in the first and second embodiments, the output layer of the second-stage neural network may be used as the correct answer image data, and the neural network may be caused to learn that the coloring process is realized in one step with respect to the target image data.

That is, as in the first and second embodiments, the case of expressing as the learned model for coloring may include both (1) the case of indicating two models when the coloring process is performed in two stages by using the learning model for designated area coloring and the learned model for entire coloring and (2) the case of indicating one model when one-step coloring process is performed for the coloring on the designated area by one learned model for coloring and the coloring on the entire area.

In the first and second embodiments, the coloring process using the learned model has been described, but in addition to this, blending with colored image data may be performed by applying the technique of alpha blending. The alpha blending is a technique of blending two images based on a predetermined ratio to obtain a target image. The final colored image data may be obtained by blending the image data on which the coloring process has been completed with respect to the designated area of the target image data and the image data on which the coloring process has been completed with respect to the entire target image data without distinguishing the designated area. In addition, in a re-coloring process using reference information for a designated area when target image data is colored image data, the final colored image data may be obtained by blending the image data of the designated area portion on which the coloring process has been completed with respect to the designated area of the target image data and the colored image data as the original target image data.

What is claimed is:

1. An information processing apparatus comprising:
one or more memories; and
one or more processors configured to
acquire a user-selected target image,
determine, as a designated area, an area within the user-selected target image, the designated area being an area to be colored,
extract a part of the user-selected target image from the user-selected target image based on the designated area, as a partial image to be inputted into a learned model for coloring, and
perform a process on the designated area, by inputting the partial image that is the part of the user-selected target image having been extracted from the user-selected target image into the learned model for coloring, wherein an entirety of the user-selected target image is not inputted into the learned model, wherein the one or more processors are configured to perform another process on the entirety of the user-selected target image to color a region that is not the designated area and that is not colored by the process based on the learned model, by inputting the entirety of the user-selected target image into another learned model for coloring an entirety of an image.

2. The information processing apparatus according to claim 1, wherein the one or more processors are further configured to
- determine whether a predetermined object is included in the user-selected target image data by an image recognition process, and
- determine an area including the predetermined object as the designated area.

3. The information processing apparatus according to claim 1, wherein the one or more processors are further configured to
- determine an object included in the designated area by performing an image recognition process on the designated area, and
- extract reference information suitable for coloring the designated area based on a result of the determination of the object.

4. The information processing apparatus according to claim 1, wherein the learned model for coloring includes an encoder and a decoder.

5. The information processing apparatus according to claim 1, wherein the one or more processors are further configured to perform the process by inputting a feature amount as reference information used for coloring the designated area to a hidden layer of the learned model for coloring of the designated area.

6. The information processing apparatus according to claim 5, wherein the one or more processors are further configured to extract the feature amount as the reference information based on a learned model which has been previously learned about extracting a feature amount from reference image data as the reference information.

7. The information processing apparatus according to claim 1, wherein the one or more processors receive a closed area designated with respect to the user-selected target image by a user, and determine, as the designated area, the area within the user-selected target image corresponding to the received closed area.

8. The information processing apparatus according to claim 1, wherein the learned model used for coloring the designated area and the another learned model used for coloring the entirety of the user-selected target image have been previously learned in different ways.

9. The information processing apparatus according to claim 1, wherein the learned model used for coloring the designated area includes a neural network.

10. An information processing method comprising:
- acquiring a user-selected target image;
- receiving a designation of an area within the user-selected target image, the designated area being an area to be colored;
- extracting a part of the user-selected target image from the user-selected target image based on the designated area, as a partial image to be inputted into a learned model for coloring; and
- performing a process on the designated area, by inputting the partial image that is the part of the user-selected target image having been extracted from the user-selected target image into the learned model for coloring, wherein an entirety of the user-selected target image is not inputted into the learned model,
- performing another process on the entirety of the user-selected target image to color a region that is not the designated area and that is not colored by the process based on the learned model, by inputting the entirety of the user-selected target image into another learned model for coloring an entirety of an image.

11. The method according to claim 10, further comprising:
- determining whether a predetermined object is included in the user-selected target image data by an image recognition process; and
- determining an area including the predetermined object as the designated area.

12. The method according to claim 10, further comprising:
- determining an object included in the designated area by performing an image recognition process on the designated area; and
- extracting reference information suitable for coloring the designated area based on a result of the determination.

13. The method according to claim 10, wherein the learned model for coloring includes an encoder and a decoder.

14. The method according to claim 10, wherein the performing the process includes inputting a feature amount as reference information used for coloring the designated area to a hidden layer of the learned model for coloring of the designated area.

15. The method according to claim 14, further comprising:
- extracting the feature amount as the reference information based on a learned model which has been previously learned about extracting a feature amount from reference image data as the reference information.

16. An information processing apparatus comprising:
- one or more memories; and
- one or more processors configured to
  - acquire a target image,
  - determine, as a designated area, an area within the target image, the designated area being an area to be colored by using reference information,
  - determine the reference information to be used for coloring the designated area, and
  - perform a process on the designated area by using the determined reference information, based on a learned model for coloring using reference information,
- wherein the learned model includes a first neural network configured to output a colored content of the designated area from an input content of the designated area and an input feature amount, and a second neural network configured to output the feature amount of the determined reference information from an input of the determined reference information to input the feature amount into the first neural network.

17. The information processing apparatus according to claim 16, wherein the one or more processors are configured to determine, as the designated area, the area within the target image based on a user's area designation.

18. A non-transitory computer readable medium storing a program that causes a computer to execute an information processing method, the method comprising:

acquiring a user-selected target image;
receiving a designation of an area within the user-selected target image, the designated area being an area to be colored;
extracting a part of the user-selected target image from the user-selected target image based on the designated area, as a partial image to be inputted into a learned model for coloring; and
performing a process on the designated area by inputting the partial image that is the part of the user-selected target image having been extracted from the user-selected target image into the learned model for coloring, wherein an entirety of the user-selected target image is not inputted into the learned model,
performing another process on the entirety of the user-selected target image to color a region that is not the designated area and that is not colored by the process based on the learned model, by inputting the entirety of the user-selected target image into another learned model for coloring an entirety of an image.

19. An information processing method comprising:
acquiring a user-selected target image;
receiving a designation of an area within the user-selected target image, the designated area being an area to be colored;
extracting a part of the user-selected target image from the user-selected target image based on the designated area, as a partial image to be inputted into a learned model for coloring; and
performing a process on the designated area, by inputting the partial image that is the part of the user-selected target image having been extracted from the user-selected target image into the learned model for coloring, wherein the entirety of the user-selected target image is not inputted into the learned model,
wherein the learned model includes a first neural network configured to output a colored content of the designated area from an input content of the designated area and an input feature amount, and a second neural network configured to output the feature amount of reference information used for coloring the designated area from an input of the reference information to input the feature amount into the first neural network.

20. A non-transitory computer readable medium storing a program that causes a computer to execute an information processing method, the method comprising:
acquiring a user-selected target image;
receiving a designation of an area within the user-selected target image, the designated area being an area to be colored;
extracting a part of the user-selected target image from the user-selected target image based on the designated area, as a partial image to be inputted into a learned model for coloring; and
performing a process on the designated area by inputting the partial image that is the part of the user-selected target image having been extracted from the user-selected target image into the learned model for coloring, wherein the entirety of the user-selected target image is not inputted into the learned model,
wherein the learned model includes a first neural network configured to output a colored content of the designated area from an input content of the designated area and an input feature amount, and a second neural network configured to output the feature amount of reference information used for coloring the designated area from an input of the reference information to input the feature amount into the first neural network.

21. An information processing method comprising:
acquiring a target image,
determining, as a designated area, an area within the target image, the designated area being an area to be colored by using reference information,
determining the reference information to be used for coloring the designated area, and
performing a process on the designated area by using the determined reference information, based on a learned model for coloring using reference information,
wherein the learned model includes a first neural network configured to output a colored content of the designated area from an input content of the designated area and an input feature amount, and a second neural network configured to output the feature amount of the determined reference information from an input of the determined reference information to input the feature amount into the first neural network.

22. The method according to claim 21, wherein the determining the designated area comprises determining, as the designated area, the area within the target image based on a user's area designation.

23. An information processing apparatus comprising:
one or more memories; and
one or more processors configured to
acquire a user-selected target image,
determine, as a designated area, an area within the user-selected target image, the designated area being an area to be colored,
extract a part of the user-selected target image from the user-selected target image based on the designated area, as a partial image to be inputted into a learned model for coloring, and
perform a process on the designated area, by inputting the partial image that is the part of the user-selected target image having been extracted from the user-selected target image into the learned model for coloring, wherein the entirety of the user-selected target image is not inputted into the learned model,
wherein the one or more processors are configured to perform another process for coloring the entirety of the user-selected target image by at least inputting, into another learned model for coloring the entirety of the user-selected target image, data that the learned model outputs based on the inputting of the partial image into the learned model.

24. The information processing apparatus according to claim 23, wherein the another learned model is configured to color the entirety of the user-selected target image while keeping a color of the designated area colored by the learned model.

25. The information processing apparatus according to claim 23, wherein the one or more processors are configured to input (i) the data that the learned model outputs and (ii) the user-selected target image into the another learned model to perform the another process.

26. An information processing method comprising:
acquiring a user-selected target image;
receiving a designation of an area within the user-selected target image, the designated area being an area to be colored;
extracting a part of the user-selected target image from the user-selected target image based on the designated area, as a partial image to be inputted into a learned model for coloring; and performing a process on the designated area, by inputting the partial image that is the part of the user-selected target image having been extracted from the user-selected target image into the learned model for coloring, wherein the entirety of the user-selected target image is not inputted into the learned model, performing another process for coloring the entirety of the user-selected target image by at least inputting, into another learned model for coloring the entirety of the user-selected target image, data that the learned model outputs based on the inputting of the partial image into the learned model.

27. The method according to claim 26, wherein the another learned model is configured to color the entirety of the user-selected target image while keeping a color of the designated area colored by the learned model.

28. The method according to claim 26, wherein the performing the another process includes inputting (i) the data that the learned model outputs and (ii) the user-selected target image into the another learned model.

* * * * *